US009209529B2

(12) United States Patent
Magno et al.

(10) Patent No.: US 9,209,529 B2
(45) Date of Patent: Dec. 8, 2015

(54) MODULE EDGE GROUNDING CABLE CLIPS

(71) Applicant: Thomas & Betts International, Inc., Wilmington, DE (US)

(72) Inventors: Joey D. Magno, Cordova, TN (US); Andrew Cole, Southaven, MS (US); Randy Dorn, Henderson, NV (US)

(73) Assignee: Thomas & Betts International, LLC, Wilmington, DE (US)

( * ) Notice: Subject to any disclaimer, the term of this patent is extended or adjusted under 35 U.S.C. 154(b) by 94 days.

(21) Appl. No.: 14/093,711

(22) Filed: Dec. 2, 2013

(65) Prior Publication Data
US 2014/0154908 A1 Jun. 5, 2014

Related U.S. Application Data

(60) Provisional application No. 61/733,035, filed on Dec. 4, 2012.

(51) Int. Cl.
*H01R 4/48* (2006.01)
*H01R 4/64* (2006.01)
*H01L 31/042* (2014.01)

(52) U.S. Cl.
CPC .. *H01R 4/48* (2013.01); *H01R 4/64* (2013.01); *H02S 20/00* (2013.01); *Y02E 10/50* (2013.01)

(58) Field of Classification Search
CPC .............................. H01R 11/282; H01R 4/643
USPC .......... 439/759, 799, 754–755, 716, 762, 773
See application file for complete search history.

(56) References Cited

U.S. PATENT DOCUMENTS

| 2,385,209 | A | | 9/1945 | Joyce | |
| 3,840,843 | A | | 10/1974 | Izraeli | |
| 4,384,753 | A | | 5/1983 | Mixon, Jr. | |
| 4,418,694 | A | * | 12/1983 | Beroff et al. | 606/158 |
| 4,906,205 | A | * | 3/1990 | Viles | 439/504 |
| 5,429,335 | A | * | 7/1995 | Cunningham | 248/229.1 |
| 6,349,727 | B1 | * | 2/2002 | Stewart, Jr. | 128/885 |
| 7,406,800 | B2 | | 8/2008 | Cinnamon et al. | |
| 7,435,134 | B2 | | 10/2008 | Lenox | |
| 7,780,472 | B2 | | 8/2010 | Lenox | |
| 7,824,191 | B1 | | 11/2010 | Browder | |
| 7,832,157 | B2 | | 11/2010 | Cinnamon | |
| 7,866,098 | B2 | | 1/2011 | Cinnamon | |
| 8,025,508 | B2 | | 9/2011 | Parker et al. | |
| 8,181,926 | B2 | | 5/2012 | Magno, Jr. et al. | |
| 8,529,585 | B2 | * | 9/2013 | Jacobs et al. | 606/139 |
| 2009/0068873 | A1 | | 3/2009 | Kulig | |

* cited by examiner

*Primary Examiner* — Phuongchi T Nguyen
(74) *Attorney, Agent, or Firm* — Snyder, Clark, Lesch & Chung, LLP

(57) ABSTRACT

A clip assembly includes a first clip comprising two opposing contact surfaces connected by a U-shaped hinge, where each of the two opposing contact surfaces has protruding flanges with teeth for engaging a surface inserted between the flanges. The clip assembly further includes a second clip comprising two opposing contact surfaces connected by a U-shaped hinge, wherein each of the two opposing contact surfaces has protruding flanges with teeth for engaging a surface inserted between the flanges. The clip assembly also includes a wire connected to the first clip at one end of the wire and to the second clip at another end of the wire.

20 Claims, 12 Drawing Sheets

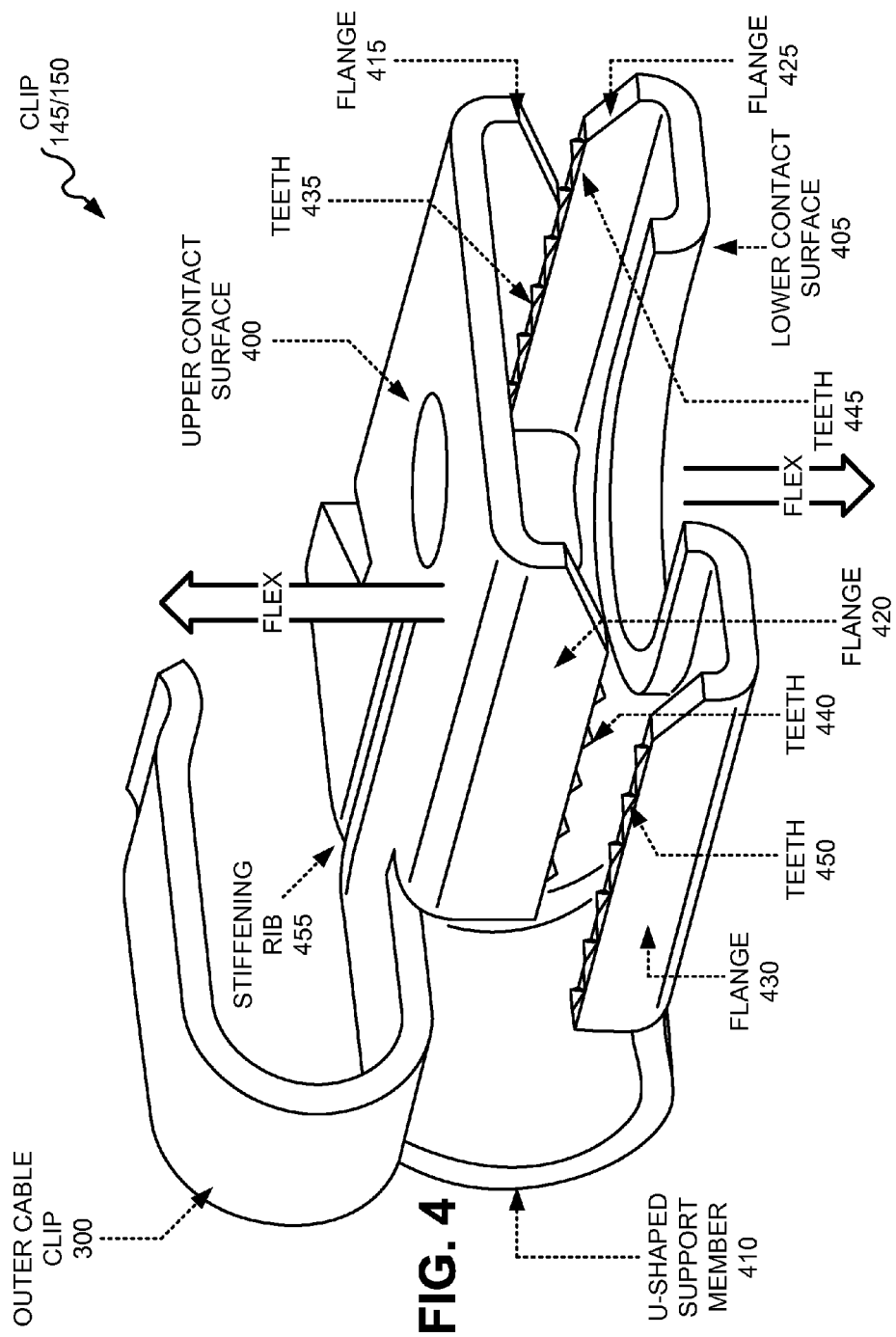

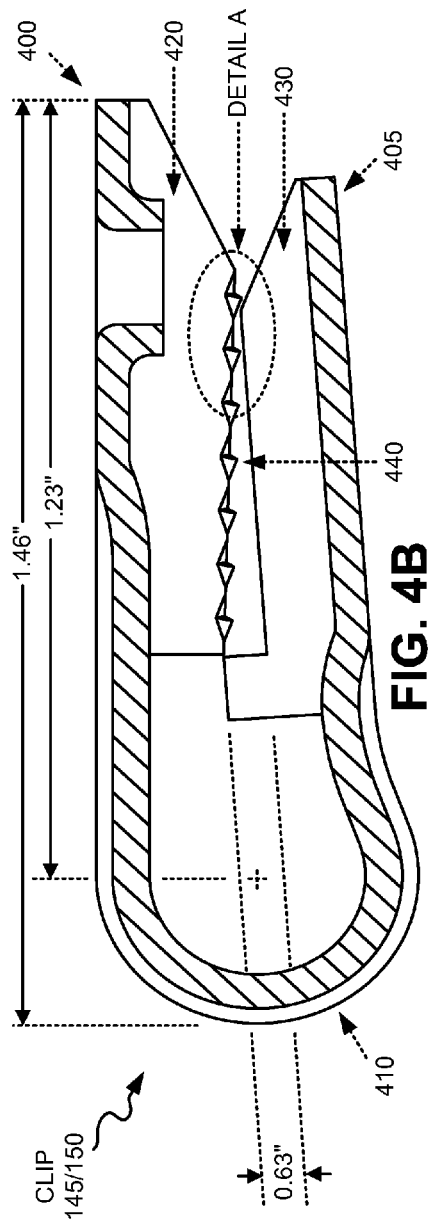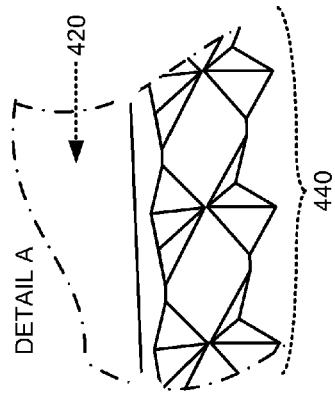
FIG. 4B
FIG. 4C
FIG. 4D

MODULE EDGE GROUNDING CABLE CLIPS

CROSS-REFERENCE TO RELATED APPLICATION

This application claims priority under 35 U.S.C. §119, based on U.S. Provisional Application No. 61/733,035, filed Dec. 4, 2012, the disclosure of which is hereby incorporated by reference herein.

BACKGROUND

Solar modules typically include arrays of solar panels disposed within a modular frame. Solar modules, in many applications, are installed as multiple modules in a series of modules. For example, four solar modules may be installed as a 1×4 series of modules (i.e., a row of four modules). As another example, six solar modules may be installed as a 2×3 array of modules (i.e., two rows of three modules each). In such multiple module applications, it is typically necessary to ground all of the modules together. An existing method of grounding all of the solar modules uses a ground lug that is mounted by a bolt and nut to a screw hole along the solar module frame with the ground wire being mechanically held by a set screw. In this grounding method, the grounding wire is then daisy chained via the ground lugs throughout all of the modules over the length of the solar module array, with the end of the grounding wire attaching directly to the ground through a ground rod.

BRIEF DESCRIPTION OF THE DRAWINGS

FIGS. 4A-4D are diagrams that depict exemplary details of a single clip of the clip assembly of FIG. 1;

DETAILED DESCRIPTION OF THE PREFERRED EMBODIMENTS

The following detailed description refers to the accompanying drawings. The same reference numbers in different drawings may identify the same or similar elements. The following detailed description does not limit the invention.

The existing methods of grounding an array of solar modules, such as, for example, daisy chaining a grounding wire via ground lugs mounted on solar module frames, typically use lugs, nuts and/or bolts that include many loose parts that require time consuming assembly for every solar module array. The daisy chaining of the grounding wire also requires long lengths of ground wire, which typically includes relatively expensive copper ground wire. Therefore, existing methods of grounding arrays of solar modules are costly and labor intensive.

A solar module grounding clip assembly is described herein which includes clips at each end of a short grounding wire for clipping onto the edges of the solar module frames. The clips include teeth that dig into the coating of the solar module frame to establish electrical contact and thereby electrically connect each of the solar module frames to one another. Through the use of a grounding clip assembly, as described herein, between adjacent solar panel modules in a modular array, all of the modules in the solar panel modular array may be grounded to one another without using lugs, nuts and/or bolts that include many loose parts, and without using long lengths of grounding wire daisy chained across the entirety of the solar panel modular array. By merely having to clip each clip assembly onto adjacent solar module frames, the time consuming assembly required for grounding the modular array according to existing techniques is substantially reduced.

Figure 1:
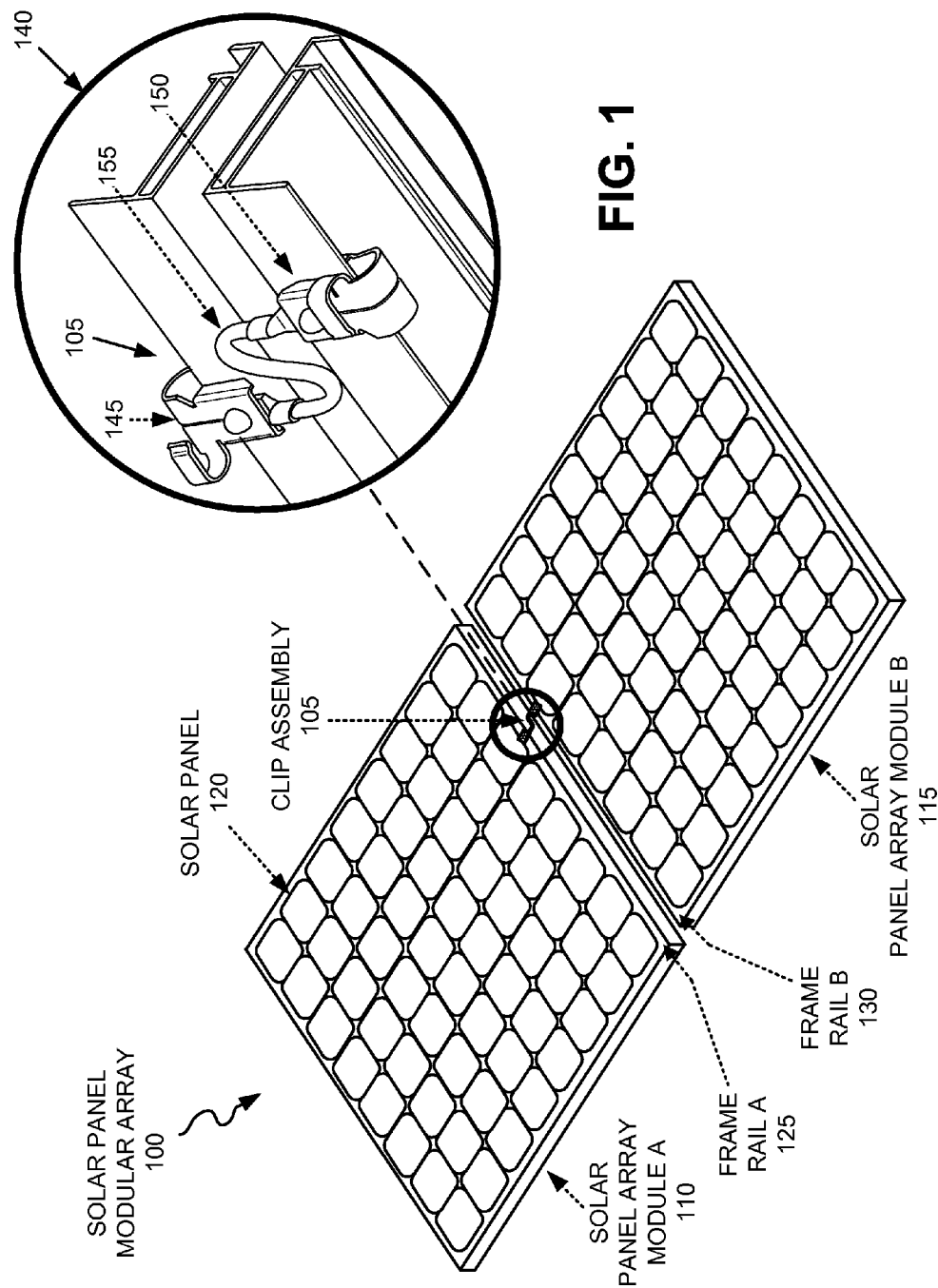
FIG. 1 is a diagram that illustrates an exemplary solar panel modular array in which clip assemblies, according to embodiments described herein, are used.

FIG. 1 depicts a solar panel modular array 100, according to an exemplary implementation, in which a clip assembly 105 is used to ground the modules of modular array 100 to one another. For purposes of illustration, modular array 100 is depicted as having two modules—solar panel array module A 110 and solar panel array module B 115. Module A 110 and module B 115 both may include an array of solar panels 120 arranged within a modular frame having frame rails that enclose and/or support the array of solar panels 120. The modular frame of module A 110 and module B 115 includes an electrically conductive material. FIG. 1 depicts module A 110 disposed adjacent to module B 115, with frame rail A 125 of module A 110 being directly adjacent to frame rail B 130 of module B 115. As shown, clip assembly 105 may be clipped to frame rail A 125 and to frame rail B 130 such that a grounding wire of clip assembly 105 may establish an electrical connection between module A 110 and module B 115, thus, ensuring that the modules are at a same electrical potential (e.g., grounded).

FIG. 1 further depicts an expanded view 140 of clip assembly 105. As shown in more detail in expanded view 140, clip assembly 105 may include a clip 145 connected to another clip 150 via a wire 155. Clip 145 is shown clipped to module A 110 and clip 150 is shown clipped to module B 115 to electrically connect module A 110 with module B 115.

Figure 2:
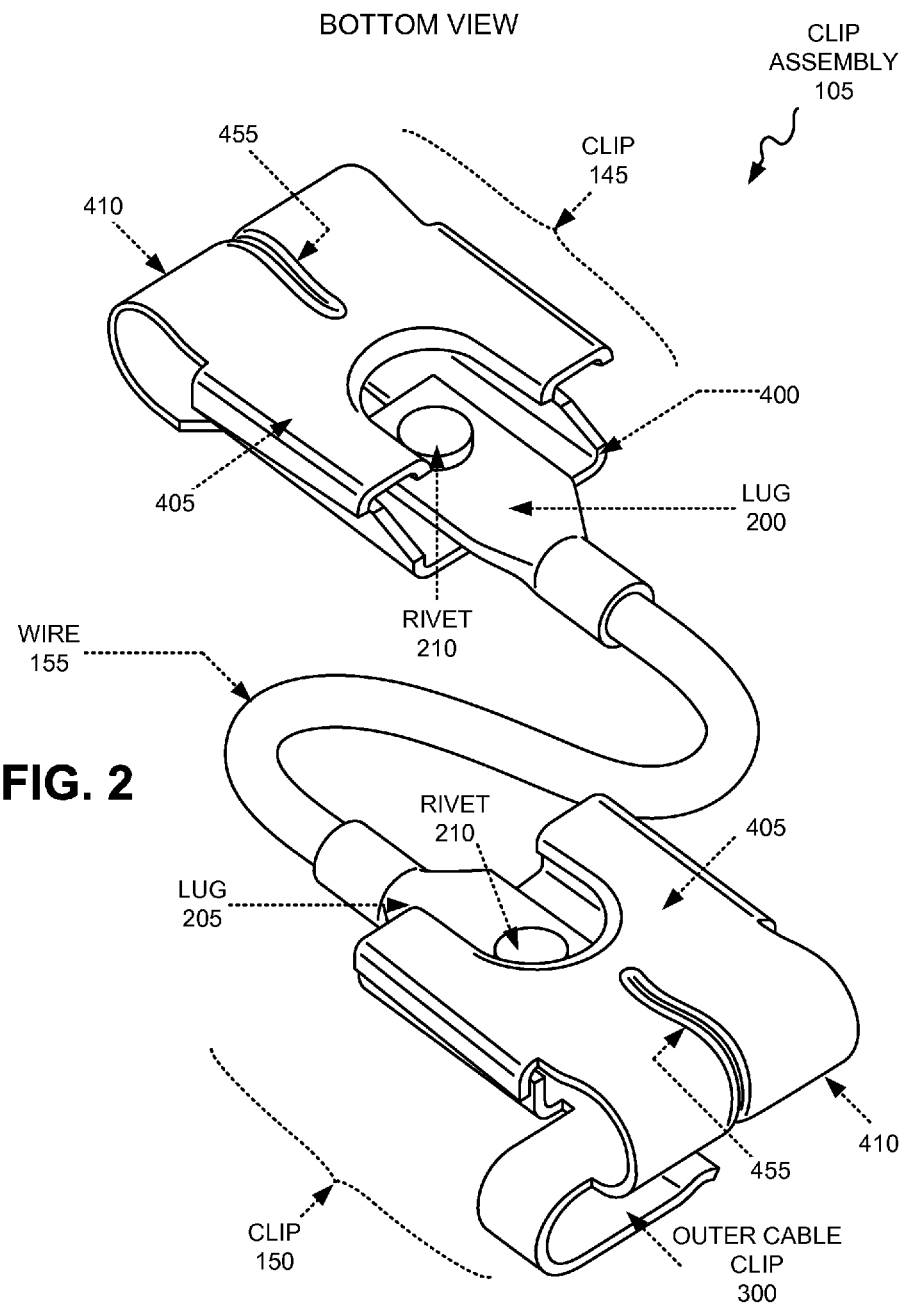
FIG. 2 is a diagram that illustrates a bottom view of the clip assembly of FIG. 1.
Figure 3:
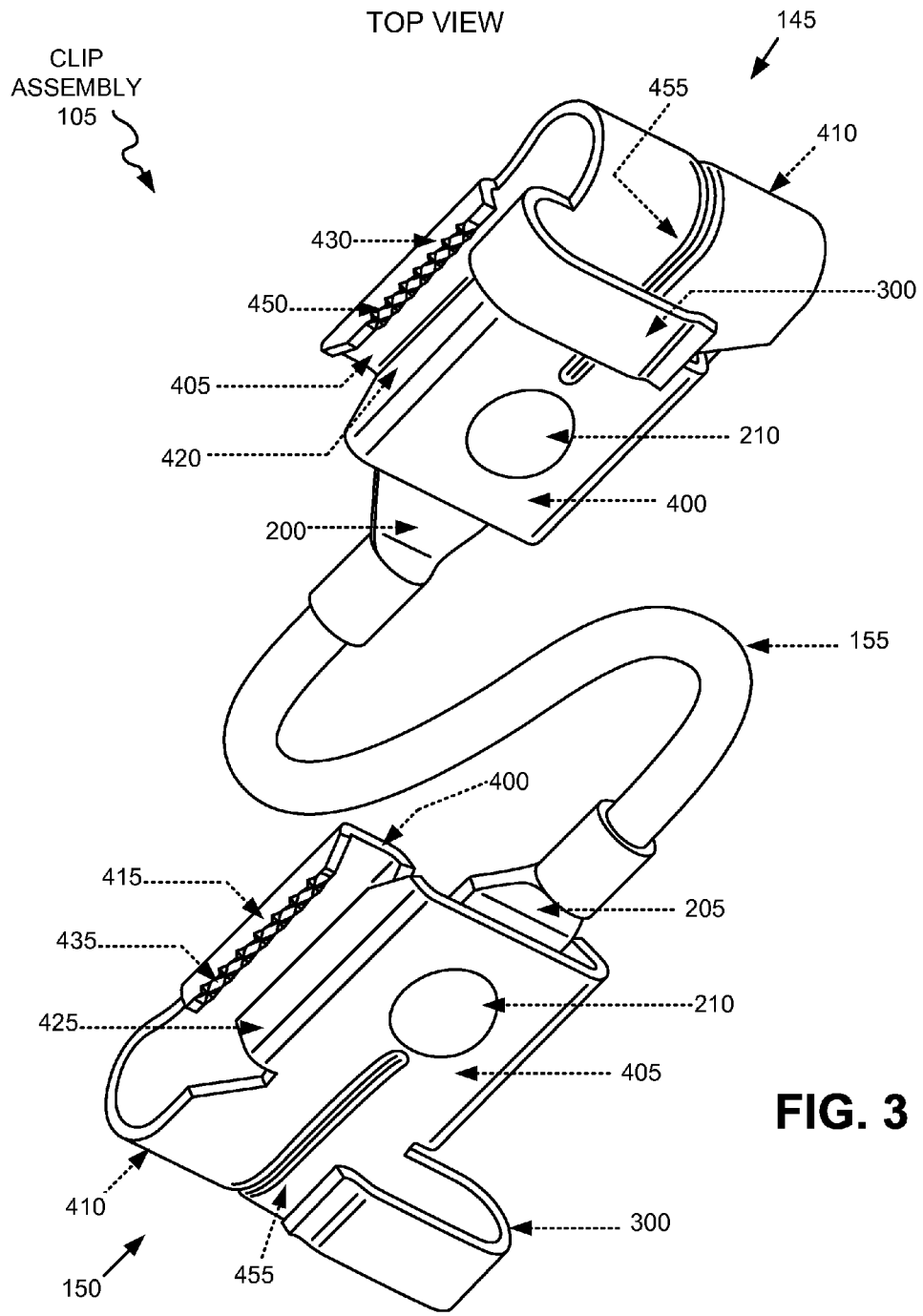
FIG. 3 is a diagram that illustrates a top view of the clip assembly of FIG. 1.
Figure 5:
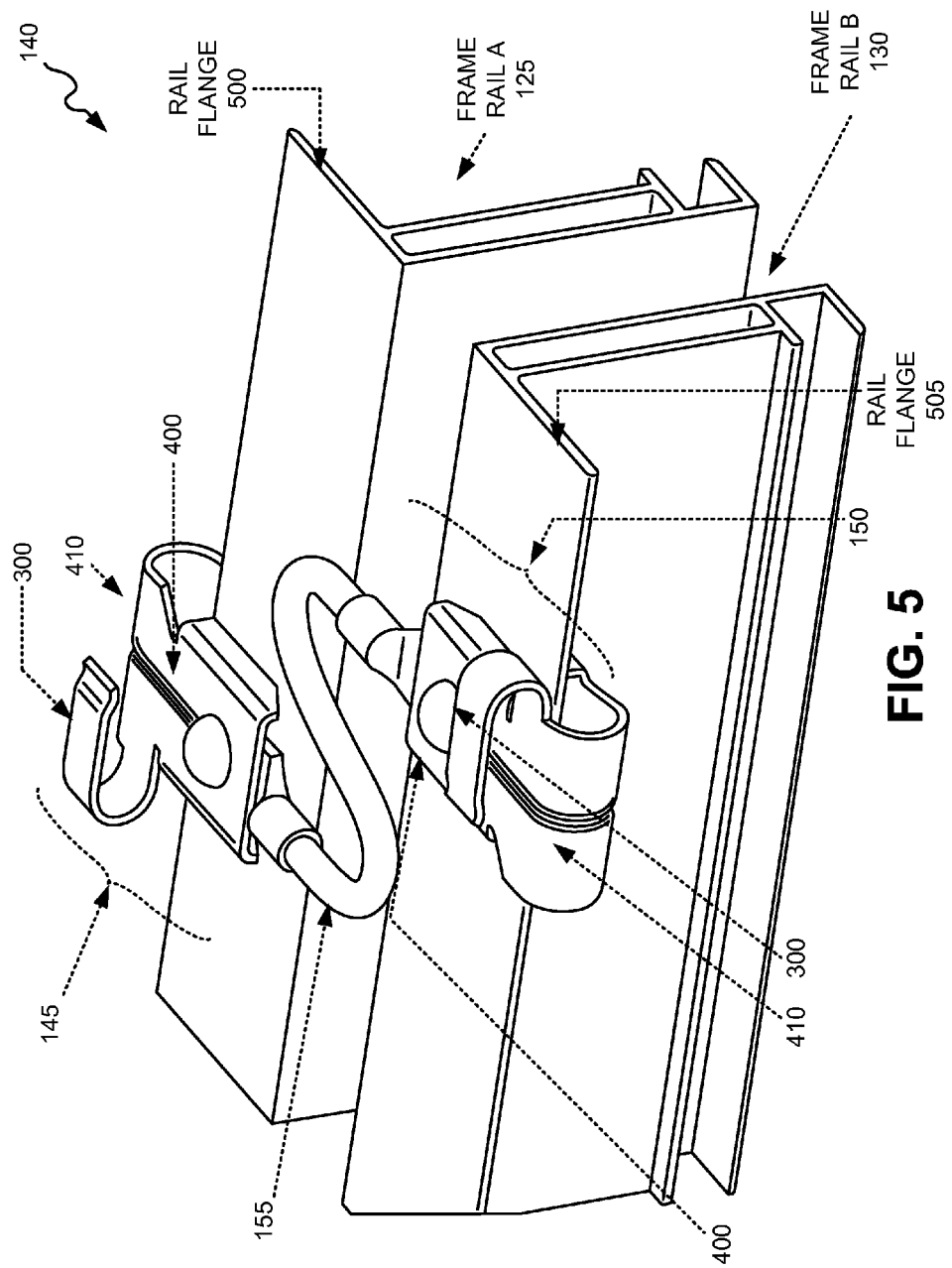
FIG. 5 is a diagram that illustrates a close-up view of the clip assembly of FIG. 1 attached to rail flanges of the frame rails of two separate solar panel array modules.

Further details of clip assembly 105 are shown in FIGS. 2-5. FIGS. 2 and 3 depict stand-alone three dimensional views of clip assembly 105, with FIG. 2 illustrating a bottom view of clip assembly 105 and FIG. 3 illustrating a top view of clip assembly 105. FIG. 4 further depicts a close-up three dimensional view of a single clip 145/150 of clip assembly 105. FIG. 5 also depicts expanded view 140 of FIG. 1 in even more detail showing clip assembly 105 clipped to frame rail A 125 of module A 110 and frame rail B 130 of module B 115.

As shown in FIGS. 2 and 3, clip assembly 105 may include clips 145 and 150 interconnected by wire 155. Wire 155, as shown, may attach to clips 145 and 150 via a lug 200 at one end of wire 155, and another lug 205 at the other end of wire 155. In one implementation, lugs 200 and 205 may attach to clips 145 and 150 using rivets 210. In other implementations, different attachment mechanisms may be used instead of lugs and rivets. For example, in one implementation, wire 155 may attach to clips 145 and 150 via lugs and screws or bolts. In another implementation, wire 155 may attach to clips 145 and 150 using only a crimping ring that, when crimped on a respective end of wire 155, attaches that end to either clip 145 or 150. The use of a crimping ring is described further below with respect to FIGS. 6 and 7. As shown in FIG. 3, clips 145 and 150 may each include an optional outer cable clip 300. When clips 145 and 150 are clipped to module A 110 and module B 115, outer cable clips 300 may protrude off of the upper surfaces of clips 145 and 150 to enable other cables and/or wires to be held in cable clips 300. Outer cable clip 300 may be formed integral to clips 145/150, or may be formed separately and then attached to clips 145/150.

FIGS. 4A-4D depict exemplary embodiments of a clip 145/150 in detail. As shown in FIG. 4A, clip 145/150 may include an upper contact surface 400 and a lower contact surface 405. Upper contact surface 400 and lower contact surface 405 may each be generally rectangular in shape and connect to one another via a U-shaped semi-flexible support member 410. Upper contact surface 400 and lower contact surface 405 may each include a rectangular shaped thin sheet of material, with upper contact surface 400 and lower contact surface 405, via their interconnection with U-shaped support member 410, being arranged in opposition to one another such that they are approximately parallel to one another. A stiffening rib 455 may be located at an approximate mid-point of upper contact surface 400, U-shaped support member 410 and lower contact surface 405 such that stiffening rib 455 extends around the exterior of upper contact surface 400, U-shaped support member 410, and lower contact surface 405. Stiffening member 455 provides strengthened rigidity to surfaces 400 and 405 and support member 410. The thin sheet of material of surfaces 400 and 405 may include steel, aluminum or some other material. In one exemplary implementation, the steel may include plated spring steel. Support member 410 may, in one implementation, include a U-shaped semi-flexible hinge formed from a thin sheet of material. The thin sheet of material of support member 410 may include also steel, aluminum or some other material. In one exemplary implementation, the steel may include plated spring steel. In one embodiment, support member 410 and contact surfaces 400 and 405 may be formed from a single sheet of material. In other embodiments, support member 410 may be formed separately from contact surfaces 400 and 405. In these embodiments, support member 410 may be attached to contact surfaces 400 and 405 using an attachment mechanism or means (e.g., solder, rivets, bolts, etc.). Support member 410 may have a width, on a side connected to surfaces 400 and 405, approximately equal to a width of an edge of the flat rectangular shape of upper contact surface and lower contact surface 405.

As shown in FIG. 4A, upper contact surface 400 may include flanges 415 and 420 which may extend downwards approximately perpendicular to surface 400 from opposing outer edges of upper contact surface 400. Lower contact surface 405 may include flanges 425 and 430 which may extend upwards approximately perpendicular to surface 405 from opposing outer edges of lower contact surface 405. An edge of flanges 415 and 420 that faces lower contact surface 405 may have serrated skives or protrusions such that flanges 415 and 420 have teeth 435 and 440, respectively. An edge of flanges 425 and 430 that faces upper contact surface 400 may also have serrated skives or protrusions such that flanges 425 and 430 have teeth 445 and 450, respectively. In other implementations, teeth 435, 440, 445 and 450 may have shapes or configurations that are different than those shown in FIG. 4A. In one exemplary embodiment (not shown in FIG. 4A), only flanges 415 and 420 of upper contact surface 400 may have teeth 435 and 440, and flanges 425 and 430 of lower contact surface 405 may not have teeth (such as shown in FIGS. 4B-4D). Alternatively, only flange 425 and 430 of lower contact surface 405 may have teeth, and flanges 415 and 420 of upper contact surface 400 may not have teeth 435 and 440. FIGS. 4B-4D, described below, provide further details of the configuration of clip 145/150 and teeth 445 and 450 in an exemplary embodiment in which only flanges 415 and 420 of upper contact surface 400 have teeth 435 and 440.

As shown in FIG. 4A, the semi-flexible nature of the thin sheet of material of U-shaped support member 410 may permit support member 410 to, with the application of external force, flex its U-shape outwards in a hinge-like motion, to temporarily open a gap between upper contact surface 400 and lower contact surface 405. Upon removal of the external force, support member 410 may return (i.e., "snap back") to its original U-shape, thus, closing the gap between upper contact surface 400 and lower contact surface 405. If an object, such as, for example, a solar module frame rail flange is inserted between upper contact surface 400 and lower contact surface 405 when the U-shape of support member 410 is flexed outwards in the hinge-like motion, when the external force is removed, the teeth 435, 440, 445 and 450 of flanges 415, 420, 425 and 430 may engage, and bite into, a surface of the solar module frame rail flange securing clips 145 and 150 to their respective module frame rail flanges. In some implementations, teeth 435 and 440, and/or teeth 445 and 450, may be eliminated from flanges 415, 420, 425 and 430, and clips 145 and 150 may be secured in place by friction caused by support member 410 "squeezing" contact surfaces 400 and 405 against the surface to which clips 145 and 150 are being secured (e.g., rail flange 500/rail flange 505 shown in FIG. 5).

FIGS. 4B-4D depict further details of the configuration of clip 145/150 according to an exemplary embodiment in which only flanges 425 and 430 have teeth 445 and 450, and flanges 415 and 420 do not have teeth 435 and 440. In the exemplary embodiment of FIGS. 4B-4D, teeth 445 and 450 have a "dragon horn" profile. As shown in FIG. 4B, clip 145/150 may have a length of 1.46 inches from an outer edge of upper contact surface 400 to the outer edge of support member 410. From the outer edge of upper contact surface 400 to a center point of support member 410 of clip 145/150 may have a length of 1.23 inches. As further shown in FIG. 4B, when upper contact surface 400 and lower contact surface 405 are in a closed position, a surface of flange 420 having teeth 440 may, at an end of flange 420 closest to U-shaped support member 410, have a gap of 0.63 inches with the opposing surface of flange 430, which in the embodiment shown in FIG. 4B does not have teeth 450. "Detail A" of the dragon horn profile of teeth 440, as shown in FIG. 4B, is further shown in a cut-away view in FIG. 4C and a three dimensional view in FIG. 4D.

FIG. 5 depicts clip 145 clipped or attached to frame rail flange 500 of frame rail A 125 and clip 150 clipped to frame rail flange 505 of frame rail B 130. With the teeth (not shown) of clips 145 and 150 biting into the surfaces of module frame rail flanges 500 and 505, an electrical connection is created between module A 110 and module B 115 via wire 155. Clip assembly 105 may be used to create an electrical connection between each module in a solar panel modular array. A ground connection may also be established between the frame of one of the modules in the solar panel modular array and a grounding rod to ground such that all of the modules of modular array 100 are grounded via clip assemblies 105.

Figure 6:
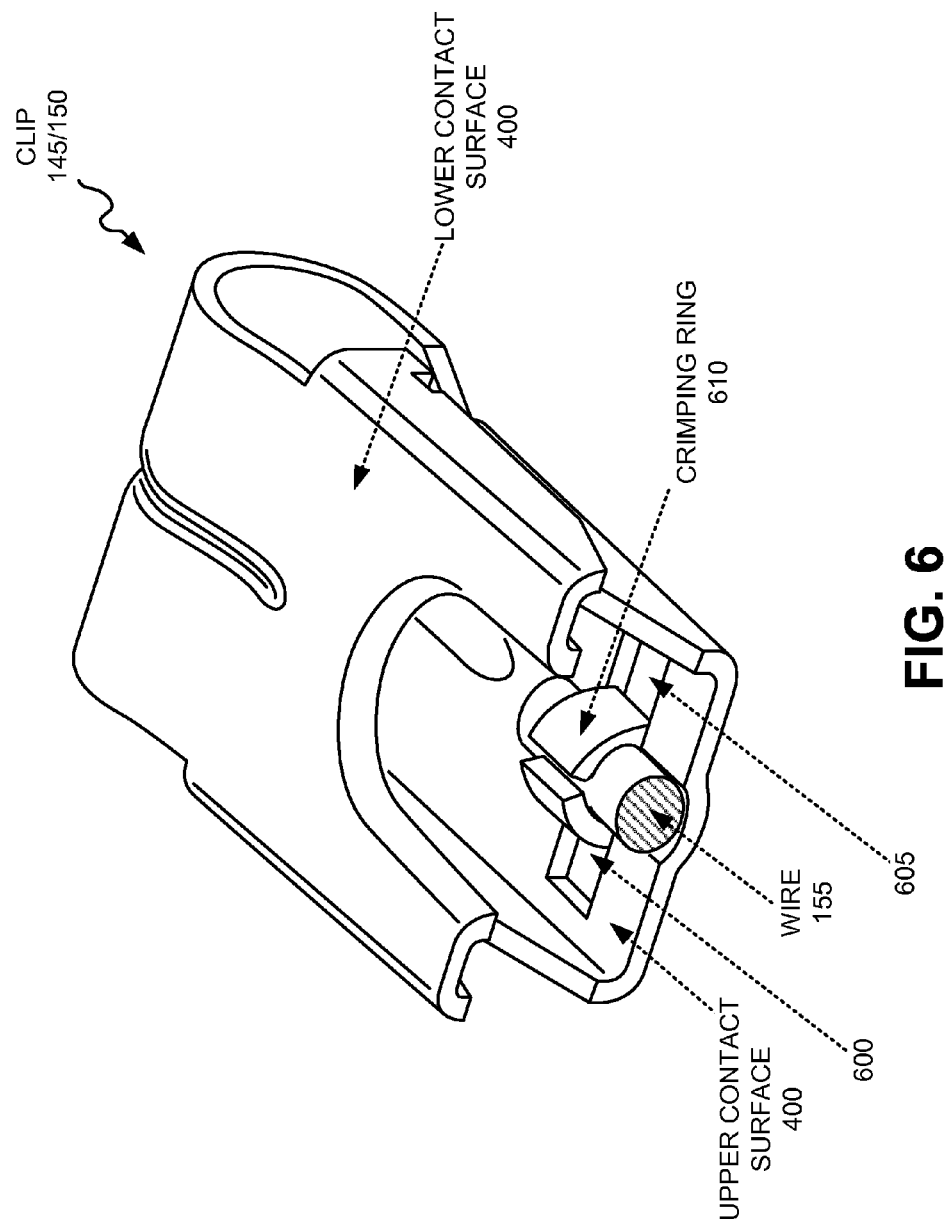
FIG. 6 is a diagram that depicts an alternative embodiment in which the ground wire of FIG. 2 is crimped to the clip using a crimping ring.
Figure 7:
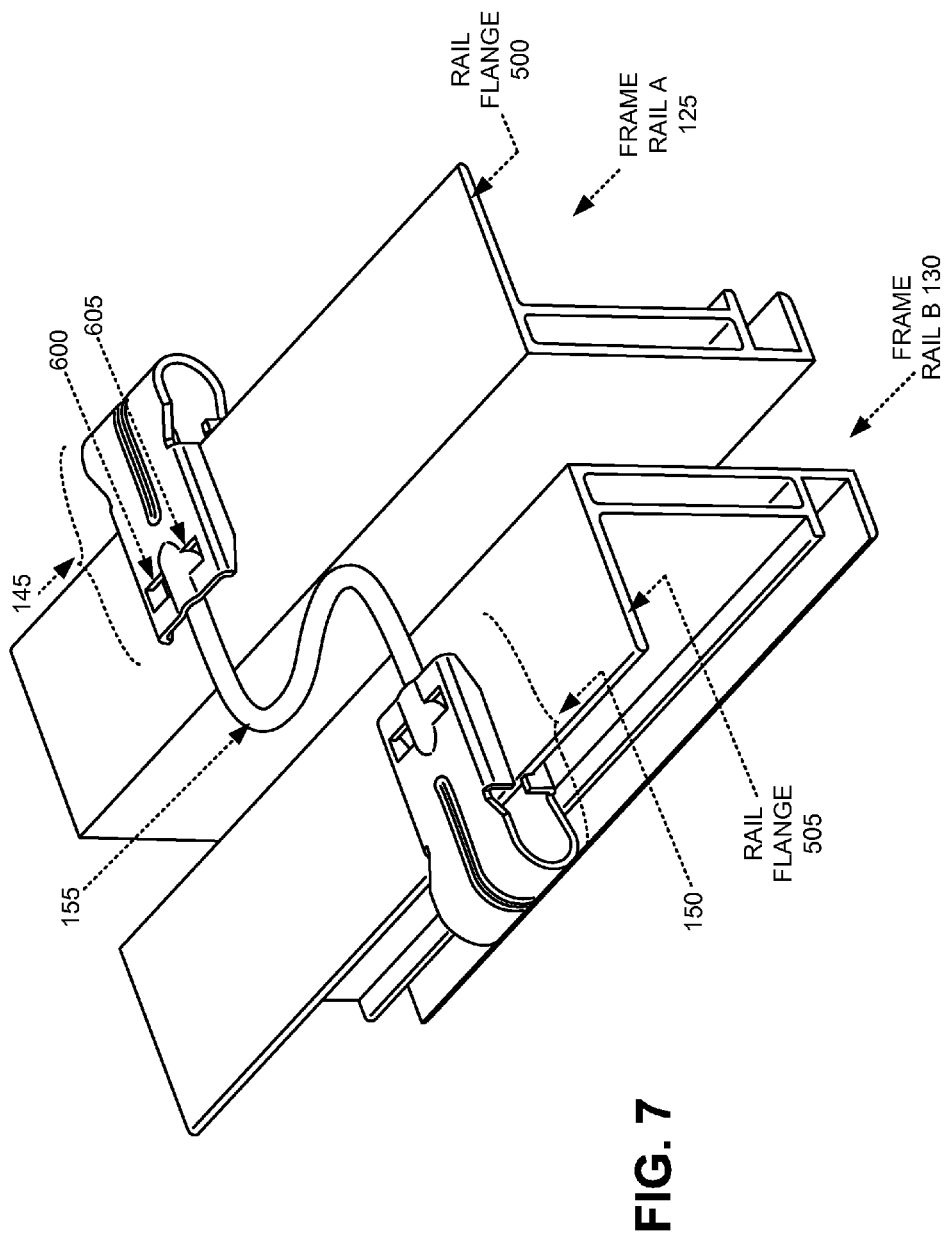
FIG. 7 is a diagram that illustrates a close-up view of a clip assembly that includes the alternative embodiment of FIG. 6 when attaching the clips to the rail flanges of the frame rails of two separate solar panel array modules.

FIGS. 6 and 7 depict an alternative embodiment in which the ground wire of clip assembly 105 is crimped to a clip 145/150 using a crimping ring. As shown in FIG. 6, upper contact surface 400 includes two cut outs 600 and 605 on either side of wire 155 where wire 155 is inserted into a crimping ring 610 to connect to contact surface 400. Crimping ring 610, with wire 155 inserted within, encompasses an end of wire 155 such that, when ring 610 is crimped (e.g., using a crimping tool), wire 155 may be held securely in connection with contact surface 400. Crimping ring 610 may be formed integral to surface 400, or ring 610 may include a stand-alone ring that is inserted through cut-outs 600 and 605 of contact surface 400. FIG. 7 further depicts the alternative embodiment of FIG. 6 secured to frame rail A 125 and frame rail B 130 of module A 110 and module B 115. As shown in FIG. 7, clip 145 is secured to rail flange 500, and clip 150 is secured to rail flange 505.

Figure 8A:
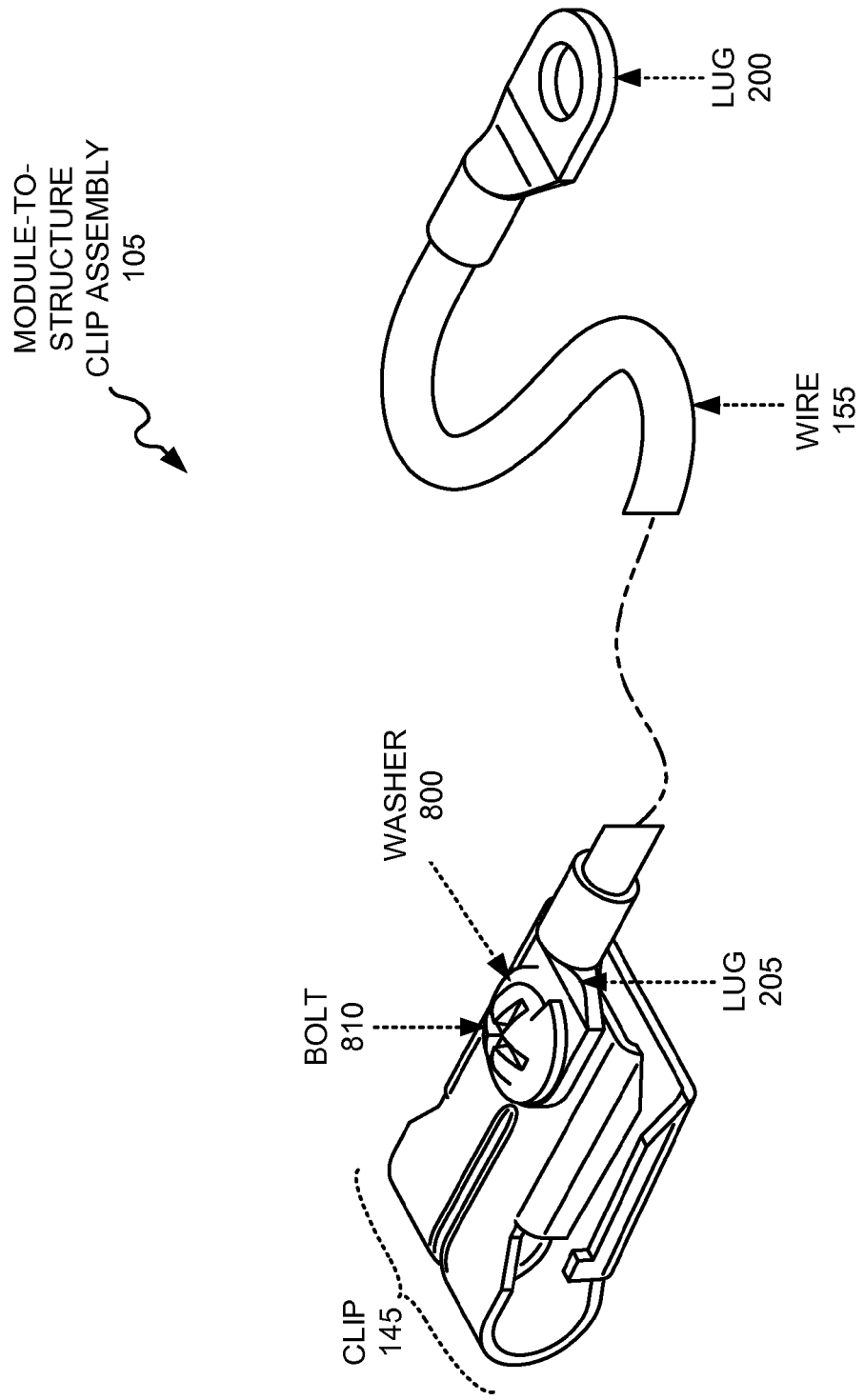
FIGS. 8A and 8B depict an exemplary embodiment in which a clip assembly includes a module-to-structure clip assembly.
Figure 8B:
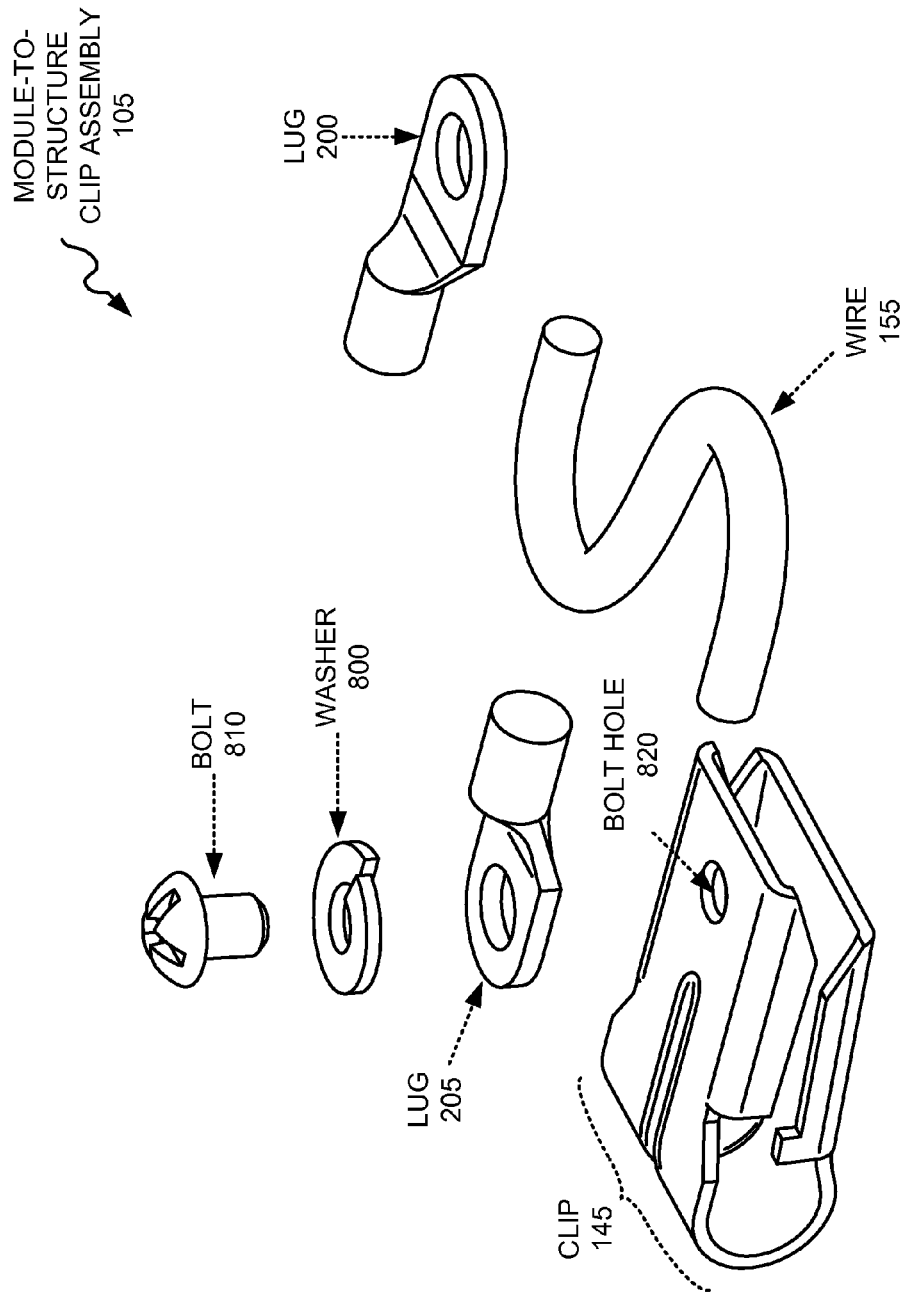

FIGS. 8A and 8B depict an exemplary embodiment in which clip assembly 105 includes a module-to-structure clip assembly. In the embodiment of FIGS. 8A and 8B, clip 145 of clip assembly 105 attaches to a frame rail of a solar panel array module and lug 200 of clip assembly 105 attaches to a structure using, for example, a bolt or screw (not shown). The structure may include an electrical connection to ground. As shown in FIGS. 8A and 8B, this embodiment includes a clip 145 connected to a wire 155 via lug 205, and a washer 800 and a bolt 810. Bolt 810 is inserted through washer 800 and lug 205 into a bolt hole 820 of clip 145 to attach wire 155 to clip 145. Lug 200 at the other end of wire 155 may be attached to the structure using a bolt or screw (not shown).

Figure 9A:
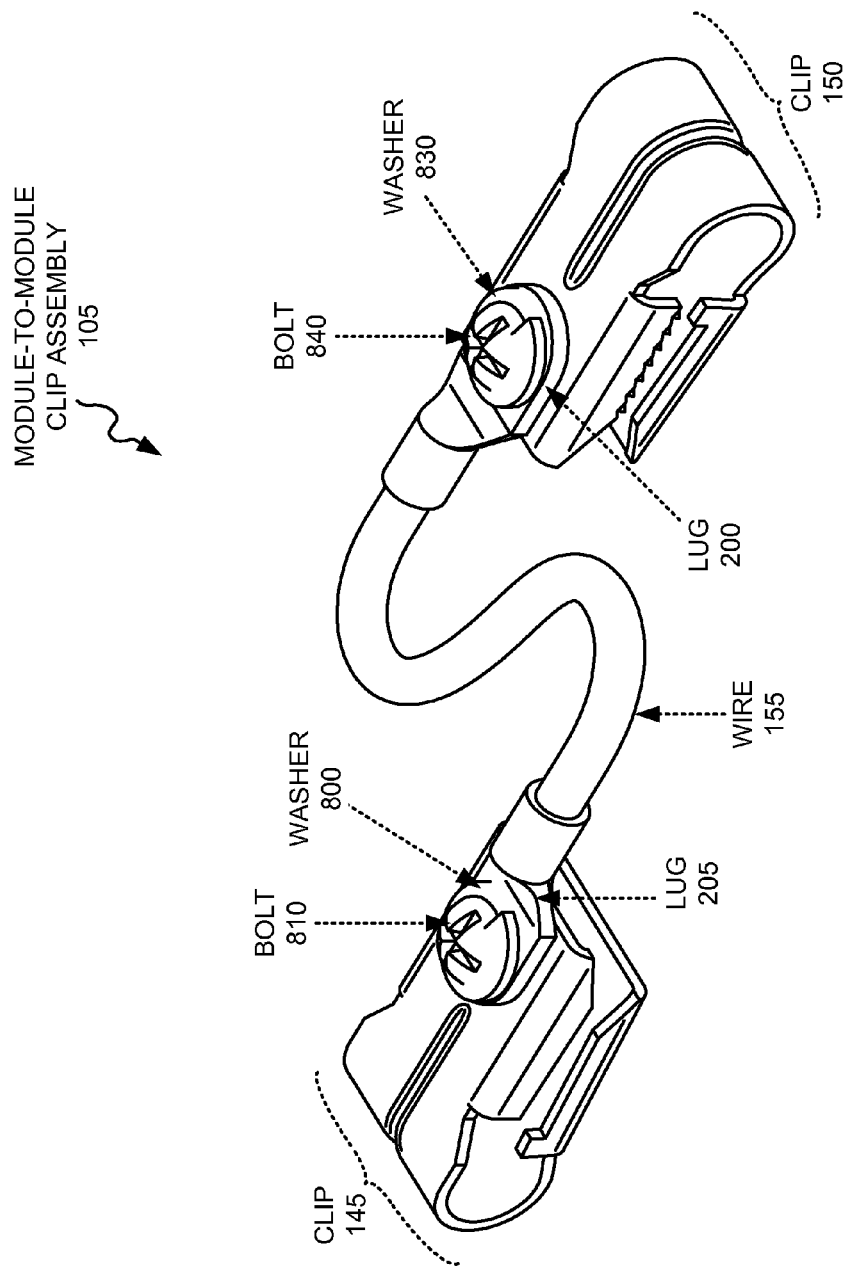
FIGS. 9A and 9B depict another exemplary embodiment in which a clip assembly includes a module-to-module clip assembly.
Figure 9B:
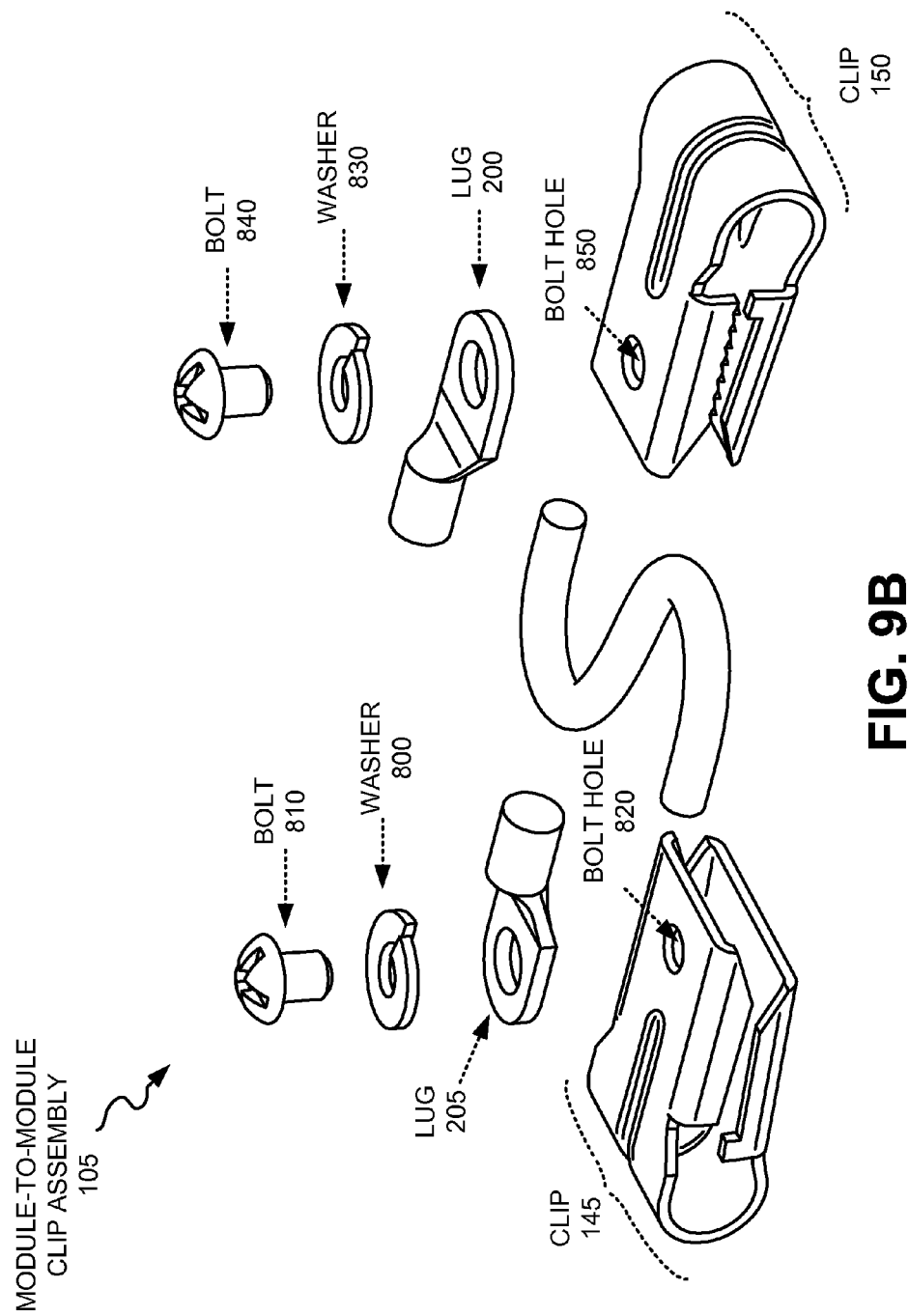

FIGS. 9A and 9B depict another exemplary embodiment in which clip assembly 105 includes a module-to-module clip assembly. In the embodiment of FIGS. 9A and 9B, clip assembly 105 attaches between two different modules—clip 145 attaches to solar panel array module A 110 (shown in FIG. 1) and clip 150 attaches to solar panel array module B 115 (shown in FIG. 1). As shown in FIGS. 9A and 9B, this embodiment includes a clip 145 connected to a wire 155 via lug 205, and a washer 800 and a bolt 810. Bolt 810 is inserted through washer 800 and lug 205 into a bolt hole 820 of clip 145 to attach wire 155 to clip 145. Clip 150 connects to wire 155 via lug 200, and a washer 830 and a bolt 840. Bolt 840 is inserted through washer 830 and lug 200 into a bolt hole 850 of clip 150 to attach wire 155 to clip 150.

A solar module grounding clip assembly is described herein that includes clips at each end of a short grounding wire for clipping onto the edges of the solar module frames, where the clips include teeth that dig into the upper surface of the solar module frame to establish electrical contact for electrically connecting each of the solar module frames to one another and for easily grounding all of the solar module frames to a ground. The time consuming assembly required for grounding the modular array according to existing techniques is substantially reduced by merely having to clip each clip assembly onto adjacent solar module frames.

Although the invention has been described in detail above, it is expressly understood that it will be apparent to persons skilled in the relevant art that the invention may be modified without departing from the spirit of the invention. Various changes of form, design, or arrangement may be made to the invention without departing from the spirit and scope of the invention. Therefore, the above mentioned description is to be considered exemplary, rather than limiting, and the true scope of the invention is that defined in the following claims.

No element used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

What is claimed is:

1. A flexible clip assembly, comprising:
   a first flexible clip comprising two opposing contact surfaces connected by a first U-shaped hinge, wherein each of the two opposing contact surfaces has protruding flanges for engaging a surface inserted between the flanges and wherein at least one of the protruding flanges has teeth;
   a wire connected to the first flexible clip at one end of the wire and to a first lug at another end of the wire;
   a second flexible clip comprising two opposing contact surfaces connected by a second U-shaped hinge, wherein each of the two opposing contact surfaces has protruding flanges for engaging a surface inserted between the flanges and wherein at least one of the protruding flanges has teeth,
   wherein the wire includes a second lug at the one end of the wire and wherein the second lug attaches to the first clip and the first lug attaches to the second clip, and
   wherein the protruding flanges comprise two flanges that protrude approximately perpendicular to a contact surface of the two opposing contact surfaces.

2. The flexible clip assembly of claim 1, wherein the two flanges protrude from one of the opposing contact surfaces towards another of the opposing contact surfaces.

3. The flexible clip assembly of claim 1, wherein each of the two opposing contact surfaces has a flat upper surface.

4. The flexible clip assembly of claim 3, wherein the flanges are connected to outer edges of the flat upper surfaces.

5. The flexible clip assembly of claim 4, wherein the first U-shaped hinge comprises a thin sheet of material formed in a U-shape and having a width approximately equal to a width of an edge of the flat upper surface.

6. The flexible clip assembly of claim 5, wherein the thin sheet of material is semi-flexible such that the first U-shaped hinge flexes to open the hinge and open a gap between the two opposing contact surfaces.

7. A flexible clip assembly, comprising:
   a first flexible clip comprising:
      a first contact surface having a flat substantially rectangular shape;
      a first flange connected to a first outer edge of the first contact surface and extending downward from the first contact surface;
      a second flange connected to a second outer edge of the first contact surface and extending downward from the first contact surface;
      a second contact surface having a flat substantially rectangular shape;
      a third flange connected to a first outer edge of the second contact surface and extending upward from the second contact surface toward the first flange of the first contact surface, wherein an upper surface of the third flange includes teeth;
      a fourth flange connected to a second outer edge of the second contact surface and extending upward from the second contact surface toward the second flange of the first contact surface, wherein an upper surface of the fourth flange includes teeth; and
      a U-shaped semi-flexible hinge connecting a third outer edge of the first contact surface with a third outer edge of the second contact surface.

8. The flexible clip assembly of claim 7, wherein a lower surface of the first flange includes teeth and wherein a lower surface of the second flange includes teeth.

9. The flexible clip assembly of claim 7, further comprising:
a second flexible clip comprising:
a first contact surface having a flat substantially rectangular shape;
a first flange connected to a first outer edge of the first contact surface and extending downward from the first contact surface;
a second flange connected to a second outer edge of the first contact surface and extending downward from the first contact surface;
a second contact surface having a flat substantially rectangular shape;
a third flange connected to a first outer edge of the second contact surface and extending upward from the second contact surface toward the first flange of the first contact surface, wherein an upper surface of the third flange includes teeth;
a fourth flange connected to a second outer edge of the second contact surface and extending upward from the second contact surface toward the second flange of the first contact surface, wherein an upper surface of the fourth flange includes teeth;
a U-shaped semi-flexible hinge connecting a third outer edge of the first contact surface with a third outer edge of the second contact surface; and
a wire having a first lug and a second lug, wherein the first lug attaches to the second contact surface of the first clip and the second lug attaches to the second contact surface of the second clip.

10. The flexible clip assembly of claim 9, wherein a lower surface of the first flange of the second clip includes teeth and wherein a lower surface of the second flange of the second clip includes teeth.

11. The flexible clip assembly of claim 7, wherein the second contact surface, via the connection by the U-shaped semi-flexible hinge, is arranged opposite, and approximately parallel to, the first contact surface in the first clip.

12. The flexible clip assembly of claim 7, wherein the first outer edge of the first contact surface is opposite the second outer edge of the first contact surface, and wherein the first outer edge of the second contact surface is opposite the second outer edge of the second contact surface.

13. The flexible clip assembly of claim 7, wherein the semi-flexible hinge comprises a sheet of material formed in a U-shape and having a width approximately equal to a width to the third outer edge of the first contact surface or the second contact surface.

14. The flexible clip assembly of claim 7, wherein the first flange and the second flange extend downward substantially perpendicular to the first contact surface.

15. The flexible clip assembly of claim 14, wherein third flange and the fourth flange extend upwards substantially perpendicular to the second contact surface.

16. The flexible clip assembly of claim 7, wherein first clip comprises steel.

17. The flexible clip assembly of claim 16, wherein the steel comprises plated spring steel.

18. The flexible clip assembly of claim 13, wherein the sheet of material flexes to open the U-shape of the hinge and open a gap between the first contact surface and the second contact surface.

19. A flexible clip assembly, comprising:
a first flexible clip comprising two opposing contact surfaces connected by a first U-shaped hinge, wherein each of the two opposing contact surfaces has protruding flanges with teeth or protrusions for engaging a surface inserted between the flanges, wherein the protruding flanges comprise two flanges that protrude approximately perpendicular to a contact surface of the two opposing contact surfaces, and wherein each of the two opposing contact surfaces has a generally rectangular shape;
a second flexible clip comprising two opposing contact surfaces connected by a second U-shaped semi-flexible hinge, wherein each of the two opposing contact surfaces has protruding flanges with teeth or protrusions for engaging a surface inserted between the flanges, wherein the protruding flanges comprise two flanges that protrude approximately perpendicular to a contact surface of the two opposing contact surfaces, and wherein each of the two opposing contact surfaces has a generally rectangular shape; and
a wire connected to the first clip at one end of the wire and to the second clip at another end of the wire.

20. The flexible clip assembly of claim 19, wherein the first and second semi-flexible hinges each comprise a thin sheet of material formed in a U-shape and having a width approximately equal to a width of an edge of the flat rectangular shape, and wherein the thin sheet of material is semi-flexible such that the U-shaped hinge flexes to open the hinge and open a gap between the two opposing contact surfaces.

* * * * *